Oct. 4, 1932.  I. SIKORSKY  1,881,141
AIRCRAFT AND CONCEALED STANCHION FOR SAME
Filed June 5, 1929  3 Sheets-Sheet 1
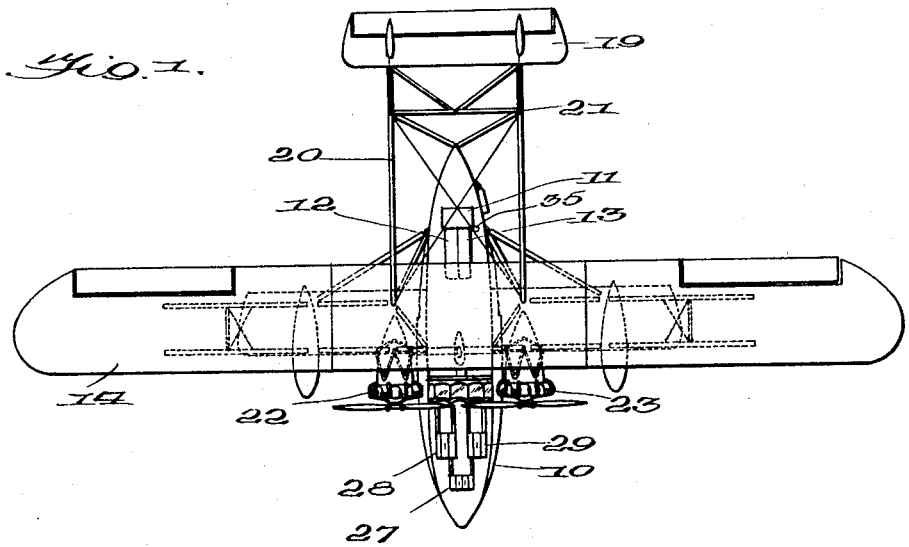
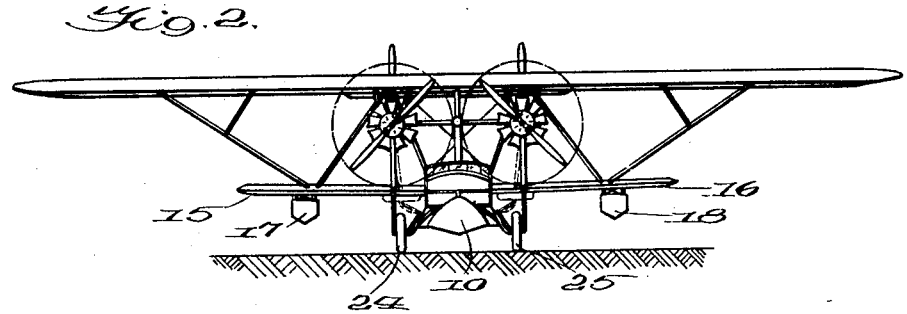
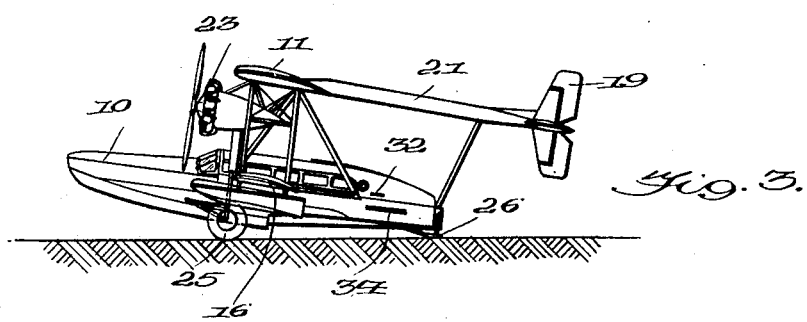

Oct. 4, 1932.  I. SIKORSKY  1,881,141
AIRCRAFT AND CONCEALED STANCHION FOR SAME
Filed June 5, 1929  3 Sheets-Sheet 2
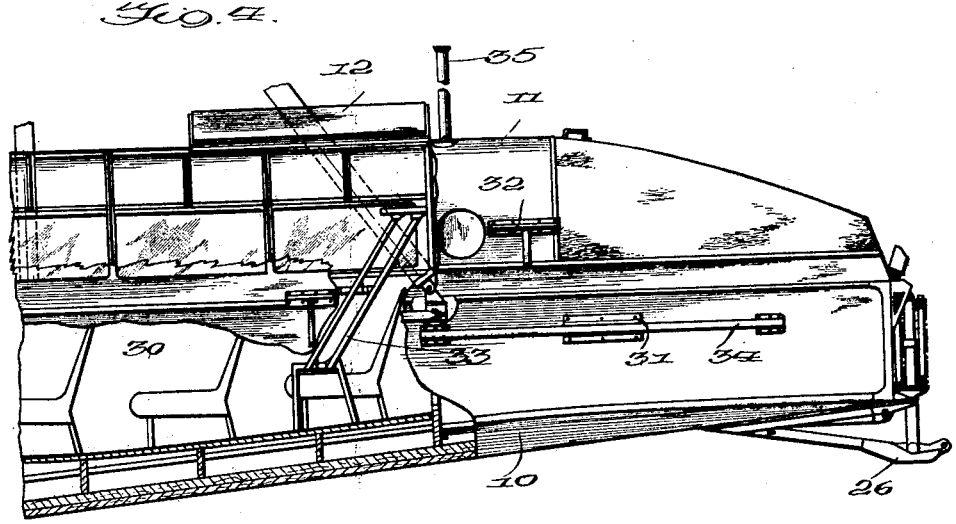
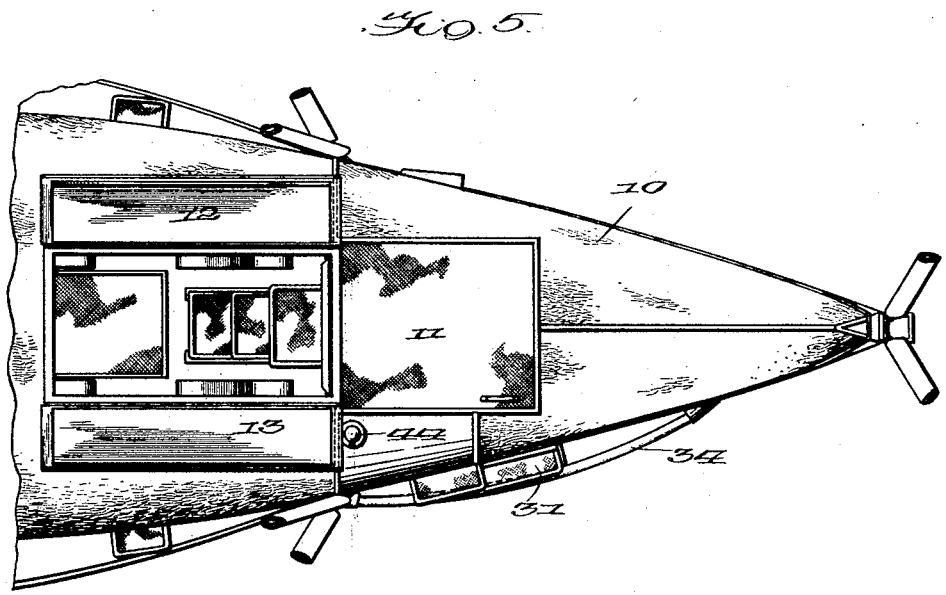
Igor Sikorsky,
INVENTOR
BY
ATTORNEY

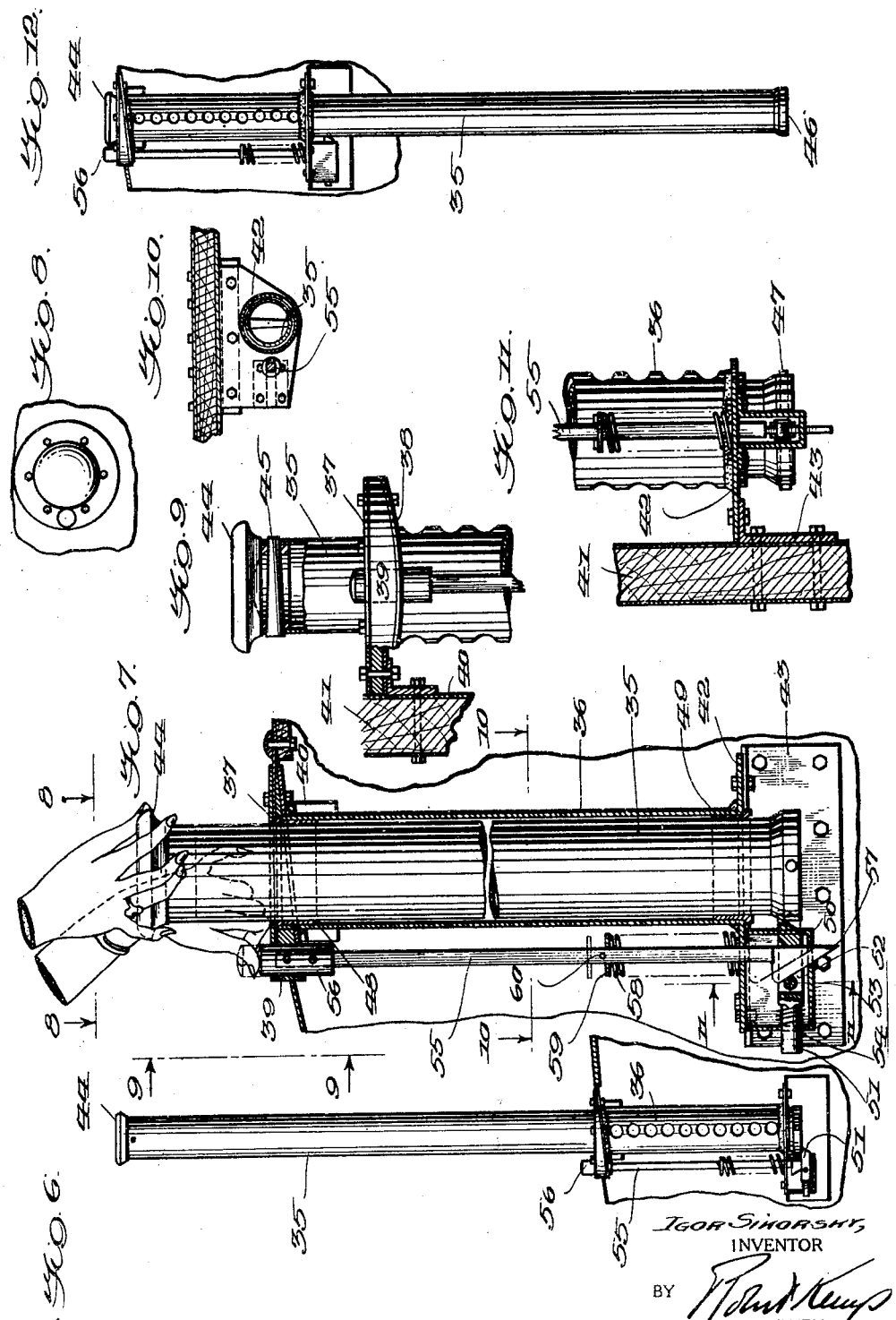

Patented Oct. 4, 1932

1,881,141

UNITED STATES PATENT OFFICE

IGOR SIKORSKY, OF COLLEGE POINT, NEW YORK, ASSIGNOR TO SIKORSKY AVIATION CORPORATION, OF WILMINGTON, DELAWARE, A CORPORATION OF DELAWARE

AIRCRAFT AND CONCEALED STANCHION FOR SAME

Application filed June 5, 1929. Serial No. 368,553.

The present invention relates to improvements in aircraft and has to do particularly with a stanchion so arranged as to be readily grasped by passengers entering or leaving the aircraft and when not in use to be collapsed so as to present no wind resistance. While the invention has to do with aircraft in general, it has particular application to machines of the land-water-air type, commonly known as amphibians, and accordingly I have illustrated it in the accompanying drawings in connection with that type of machine.

In the drawings:

Figure 1 is a plan view of the amphibian.

Figure 2 is a front elevation of the amphibian.

Figure 3 is a side elevation of the same.

Figure 4 is an elevation, with parts broken away, of the rear portion of the amphibian body-boat.

Figure 5 is a plan view of the same portion of the body-boat.

Figure 6 is an elevation of the stanchion and its supporting means.

Figure 7 is an enlarged view of the stanchion and its supporting means.

Figure 8 is a view of the amphibian seen in the direction of the arrows 8—8, Figure 7.

Figure 9 is a view of the stanchion and its supporting means when in the direction of the arrows 9—9 of Figure 7.

Figure 10 is a section on line 10—10 of Figure 7.

Figure 11 is a section on line 11—11 of Figure 7, and

Figure 12 is an elevation of the stanchion and its supporting means, the stanchion being in its lower position.

Referring to the drawings, 10 indicates a body-boat provided with an aft platform 11 and hatches 12 and 13. A main plane 14 extends above the body-boat and lower wings 15 and 16 project laterally of the body-boat, these being suitably connected with the main plane through interplane struts. Each of the lower planes supports near its outer end a pontoon such as 17 and 18.

An empennage 19 is supported at the rearward ends of outriggers 20 and 21 which project from the main plane in symmetrical relation to the longitudinal axis of the body-boat. Motors 22 and 23 are suspended from the main wing forwardly thereof in line with outriggers 20 and 21.

In order that the machine may be brought to rest on the ground, landing wheels 24 and 25 are provided, these being movable through suitable mechanism from the full line position of Figure 2 to the dotted line position. A tail skid 26 is adapted to cooperate with the landing wheels.

The fore part of the body-boat is taken up by water-tight compartments which underlie hatches 27, 28 and 29. The pilots' compartment is arranged next to the most rearward compartment and beyond the pilots' compartment is a passenger compartment 30 of which the rear portion is visible in Figures 4 and 5. Access is had to the passenger compartment by means of external steps 31, 32, platform 11 and an internal demountable ladder 33. As here shown, step 31 is partially supported by means of a bowed rod 34 which serves the other functions of hand rail and bumper.

Arranged adjacent platform 11 so as to be within convenient reach of one entering or leaving the boat is a disappearing stanchion 35, this being shown in detail in Figures 6 to 12.

The stanchion is preferably a tubular member mounted for sliding movement in a tubular guide member 36 which for the sake of lightness may be provided with suitable cutouts. Member 36 is secured at its upper end, as by welding, to a combined bracket and fitting comprising upper and lower plates 37 and 38, an intermediate block 39 and an angle member 40 secured to a body-boat structural member 41. The lower end of member 36 is similarly secured in an aperture in a bracket comprising a plate 42 and an angle member 43 likewise secured to member 41. In this manner member 36 is rigidly secured in vertical position.

Stanchion 35 is provided at its upper end with a cap 44 which is secured in place by means of a pin 45. To the lower end of the stanchion a ring 46 having an upper bevelled surface is secured by means of a pin 47. Cap 44 is of such shape as to be readily grasped in order to lift the stanchion to operative position and it also serves to limit the downward movement of the stanchion through contact with the upper end of member 38 or with plate 37 if the margins of the aperture in the latter overlie the upper edges of member 36 as is the case in Figure 7. Ring 46 through abutment with the lower end of member 36 is adapted to limit the upward movement of the stanchion. In order to reduce the friction between the stanchion and tubular guide member 36, bushings 48 and 49 may be secured in the ends of the latter.

Secured to the underside of plate 42 adjacent the stanchion is a box-like frame 50 in which is slidable a latch 51 on a line substantially radial to the stanchion. The forward portion of the latch is of rectangular section and is guided in a rectangular aperture in a wall of frame 50, thus preventing rotation of the latch about its longitudinal axis.

The rear cylindrical end of the latch is guided in a suitable aperture in the opposite wall of member 50. The forward portion of the latch is provided with a through slot 52 across which extends a pin 53. The nose of the latch is downwardly bevelled and is urged toward the stanchion by a spring 54 interposed between the enlarged forward portion of the latch and the adjacent wall of frame 50.

A pin or plunger 55 is slidable parallel to stanchion 35 in suitable apertures in the above mentioned brackets. At the upper end of the plunger is secured a head 56 while the lower end of the plunger is expanded to form a substantially triangular head 57 which projects into slot 52 of latch 51. Plunger 55 is normally yieldably maintained in the position of Figures 6 and 12 and the dotted line position of Figure 7, by means of a spring 58 interposed between plate 42 and a washer 59 surrounding the plunger and held against upward displacement relative thereto by a pin 60.

When the stanchion is to be used, it is only necessary to grasp cap 44 and pull the stanchion upwardly. As the stanchion moves upwardly ring 46 eventually strikes the nose of latch 50 which temporarily yields and then springs back into position below the stanchion retaining the latter securely in the extended position of Figure 6.

When the stanchion has served its purpose, it is only necessary to depress plunger 55 by pressure on head 56 whereupon the cam surface of head 57 coacting with pin 53 withdraws the nose of the latch from beneath the stanchion, permitting the latter to gravitate to its lower position as shown in Figure 12.

Ring 46 it will be noted is adapted to cooperate with latch 51 throughout its periphery.

It is to be understood that the described embodiment is intended to be merely illustrative and not restrictive of my invention and I do not limit myself to structure except as stated in the following claims.

I claim:

1. In aircraft construction a stanchion slidable in a guideway, said stanchion being slidable from an extended operative position outside of said aircraft to a concealed position within said aircraft.

2. In aircraft construction a slidable stanchion having means associated therewith for locking said stanchion in its extended position, said stanchion being slidable from an extended operative position outside of said aircraft to a concealed position within said aircraft.

3. A slidable stanchion for aircraft, said stanchion being slidable from an extended operative position outside of said aircraft to a concealed position within said aircraft.

4. In aircraft construction a slidable stanchion provided at its upper end with means for grasping said stanchion manually and sliding same, said stanchion being slidable from an extended operative position outside of said aircraft to a concealed position within said aircraft.

5. In an aircraft, a vertically disposed guideway, a stanchion slidable in said guideway from a lower to an upper portion or vice versa, and releasable means for locking the stanchion in its upper position.

6. In an aircraft, a vertically disposed guideway, a stanchion slidable in said guideway from a lower to an upper position or vice versa, means for locking the stanchion in its upper position, and manually operable means for releasing said locking means to permit the stanchion to gravitate to its lower position.

7. In an aircraft, a vertically disposed guideway, a stanchion slidable in said guideway from a lower to an upper position or vice versa, means for locking the stanchion in its upper position, and manually operable means slidable in a direction parallel to the stanchion for releasing said locking means to permit the stanchion to gravitate to its lower position.

8. In an aircraft, a vertically disposed guideway including vertically spaced perforated brackets, a stanchion slidable in the perforations of said brackets from a lower to an upper position or vice versa, and means in connection with one of the brackets for releasably locking the stanchion in its upper position.

9. In an aircraft, a vertically disposed guideway including vertically spaced perforated brackets, a stanchion slidable in the perforations of said brackets from a lower to an upper position or vice versa, means in connection with one of the brackets for locking the stanchion in its upper position, and means guided in both of the brackets for releasing said locking means.

10. In an aircraft, a vertically disposed guideway, a stanchion slidable in said guideway from a lower to an upper position or vice versa, a latch slidable transversely of the stanchion for engaging and retaining it in its upper position, and means slidable parallel to the stanchion for withdrawing said latch to permit the stanchion to gravitate to its lower position.

11. In an aircraft, a vertically disposed tubular guide member, a stanchion slidable in said guide member from a lower to an upper position or vice versa, said stanchion having end enlargements cooperating with the ends of said guide member to limit its sliding movements, and means for arresting said stanchion in its upper position.

12. In an aircraft, a vertically disposed tubular guide member, a stanchion slidable in said guide member from a lower to an upper position or vice versa, said stanchion having end enlargements cooperating with the ends of said guide member to limit its sliding movements, and a latch adapted to engage under the lower enlargement to arrest the stanchion in its upper position.

13. In an aircraft, a vertically disposed tubular guide member, a stanchion slidable in said guide member from a lower to an upper position or vice versa, said stanchion having end enlargements cooperating with the ends of said guide member to limit its sliding movements, and a spring pressed latch to engage under the lower enlargement to arrest the stanchion in its upper position.

14. In an aircraft, a vertically disposed tubular guide member, a stanchion slidable in said guide member from a lower to an upper position or vice versa, means limiting the sliding movements of said stanchion, a spring pressed latch projecting transversely of said stanchion and adapted to engage the latter to retain it in its upper position, a plunger slidable parallel to the stanchion, said plunger having a cam face adapted upon depression of the plunger to engage the latch to withdraw it from engagement with the stanchion, and yieldable means opposing the depression of said plunger.

15. In aircraft construction a slidable stanchion and a guideway in which said stanchion is adapted to slide from an exposed to a concealed position and/or from a concealed to an exposed position.

Signed at College Point, Long Island, in the county of Queens and State of New York, this 30th day of April, A. D. 1929.

IGOR SIKORSKY.